United States Patent
Herring

(10) Patent No.: US 11,826,992 B2
(45) Date of Patent: Nov. 28, 2023

(54) COMPOSITE STRUCTURE

(71) Applicant: Jiva Materials Ltd, London (GB)

(72) Inventor: Jack Herring, London (GB)

(73) Assignee: Jiva Materials Ltd

( * ) Notice: Subject to any disclaimer, the term of this patent is extended or adjusted under 35 U.S.C. 154(b) by 0 days.

(21) Appl. No.: 16/625,930

(22) PCT Filed: Jun. 20, 2018

(86) PCT No.: PCT/GB2018/051723
§ 371 (c)(1),
(2) Date: Dec. 23, 2019

(87) PCT Pub. No.: WO2018/234801
PCT Pub. Date: Dec. 27, 2018

(65) Prior Publication Data
US 2020/0156356 A1  May 21, 2020

(30) Foreign Application Priority Data

Jun. 21, 2017 (GB) ..................... 1709925

(51) Int. Cl.
*B32B 27/12* (2006.01)
*B32B 7/06* (2019.01)
(Continued)

(52) U.S. Cl.
CPC ............ *B32B 27/12* (2013.01); *B32B 5/12* (2013.01); *B32B 5/26* (2013.01); *B32B 7/06* (2013.01);
(Continued)

(58) Field of Classification Search
CPC ........... B32B 27/12; B32B 7/12; B32B 15/14; B32B 9/045; B32B 5/26; B32B 5/12;
(Continued)

(56) References Cited

U.S. PATENT DOCUMENTS 3,413,229 A  11/1968  Bianco et al.
3,607,812 A  9/1971  Takigawa et al.
(Continued)

FOREIGN PATENT DOCUMENTS

DE   286709 A7   2/1991
EP   0615838 A1  9/1994
(Continued)

OTHER PUBLICATIONS

Machine_English_Translation_JP_05024148_A; Hanatani, Nobuo ; Self-Adhesive Tape for Water-Soluble Mask ; Feb. 2, 1993; EPO; whole document (Year: 1993).*
(Continued)

*Primary Examiner* — Tahseen Khan
(74) *Attorney, Agent, or Firm* — BEHMKE INNOVATION GROUP LLC; James M. Behmke; James J. Wong

(57) ABSTRACT

A composite structure 10 comprises one or more layers 12 of structural material and one or more layers of adhesive material 28 binding the one or more structural layers together. The one or more layers of structural material are coated with a bonding agent. The one or more layers of adhesive material are at least partially soluble or separable in water. A method of making a composite structure is also provided.

12 Claims, 15 Drawing Sheets

(51) Int. Cl.
*B32B 7/12* (2006.01)
*B32B 15/14* (2006.01)
*B32B 5/12* (2006.01)
*B32B 5/26* (2006.01)
*B32B 9/02* (2006.01)
*B32B 9/04* (2006.01)
*B32B 27/30* (2006.01)
*B32B 38/10* (2006.01)

(52) U.S. Cl.
CPC ............... *B32B 7/12* (2013.01); *B32B 9/02* (2013.01); *B32B 9/045* (2013.01); *B32B 15/14* (2013.01); *B32B 27/306* (2013.01); *B32B 38/10* (2013.01); *B32B 2250/42* (2013.01); B32B 2255/02 (2013.01); B32B 2255/26 (2013.01); B32B 2260/021 (2013.01); B32B 2260/046 (2013.01); B32B 2262/065 (2013.01); B32B 2307/206 (2013.01); B32B 2307/7166 (2013.01); B32B 2307/748 (2013.01); B32B 2311/12 (2013.01); B32B 2317/20 (2013.01); B32B 2457/08 (2013.01)

(58) Field of Classification Search
CPC ......... B32B 38/10; B32B 9/02; B32B 27/306; B32B 7/06
USPC .......................................... 428/172
See application file for complete search history.

(56) References Cited

U.S. PATENT DOCUMENTS

| | | | | |
|---|---|---|---|---|
| 3,968,283 | A * | 7/1976 | Schutte | D02G 3/408 428/90 |
| 5,415,925 | A * | 5/1995 | Austin | B32B 5/26 442/346 |
| 2002/0013559 | A1 | 1/2002 | Shimizu | |
| 2003/0082363 | A1* | 5/2003 | Nakagiri | H05K 3/4069 428/313.3 |
| 2005/0208854 | A1* | 9/2005 | Sadato | A41D 27/24 442/289 |
| 2009/0018517 | A1* | 1/2009 | Cecconi | B32B 5/022 604/365 |
| 2011/0042302 | A1* | 2/2011 | Shooshtari | D04H 1/587 210/508 |
| 2012/0141753 | A1* | 6/2012 | Hunrath | C09J 171/00 428/355 R |
| 2013/0188323 | A1* | 7/2013 | Hunt | H05K 13/00 156/60 |
| 2017/0006701 | A1* | 1/2017 | Casasanta, III | B32B 27/285 |
| 2017/0086285 | A1* | 3/2017 | Yang | B32B 27/285 |

FOREIGN PATENT DOCUMENTS

| | | | |
|---|---|---|---|
| EP | 0911152 | A2 | 10/1998 |
| EP | 1166803 | A2 | 6/2001 |
| EP | 2500464 | A2 | 9/2012 |
| GB | 1308531 | A | 2/1970 |
| GB | 2498871 | A | 7/2013 |
| JP | 05024148 | A * | 2/1993 |
| JP | H05024148 | A | 2/1993 |
| JP | H10266009 | A | 10/1998 |
| JP | 2003133688 | A | 5/2003 |
| JP | 2007092138 | A | 4/2007 |
| KR | 950012774 | B1 * | 10/1995 |
| WO | WO-9737842 | A1 | 10/1997 |
| WO | WO-2005041634 | | 5/2005 |
| WO | WO-07109353 | A1 | 9/2007 |
| WO | WO-20090079579 | | 6/2009 |
| WO | WO-2015137922 | A1 | 9/2015 |

OTHER PUBLICATIONS

Machine_English_translation_KR_950012774_B1; Yun, Yong-Ju, et. al.; NonIflammable Adhesive Composition; Oct. 21, 1995; EPO; whole document (Year: 2023).*
GB Search Report, GB1709925.0, dated Nov. 2017, 4 pages, Examiner Robert Black.
GB Search Report, GB1810162.6, dated Oct. 2018, 6 pages, Examiner Robert Black.
"Printed circuit board", online: https://en.wikipedia.org/w/index.php?title=Printed circuit board&oldid=784819729, printed Oct. 1, 2020, 26 pages, Wikimedia Foundation, Inc.
Intellectual Property Office Citation issued in connection with Application No. GB1810162.6, including "PCB Manufacturing Process: how are PCBs made": https://www.electronics-notes.com/articles/constructional techniques/printed-circuit-board-pcb/pcb-manufacturing-process.php, viewed Jul. 24, 2020.
Intellectual Property Office Examination Report dated Jul. 27, 2020 in connection with Application No. GB1810162.6.

* cited by examiner

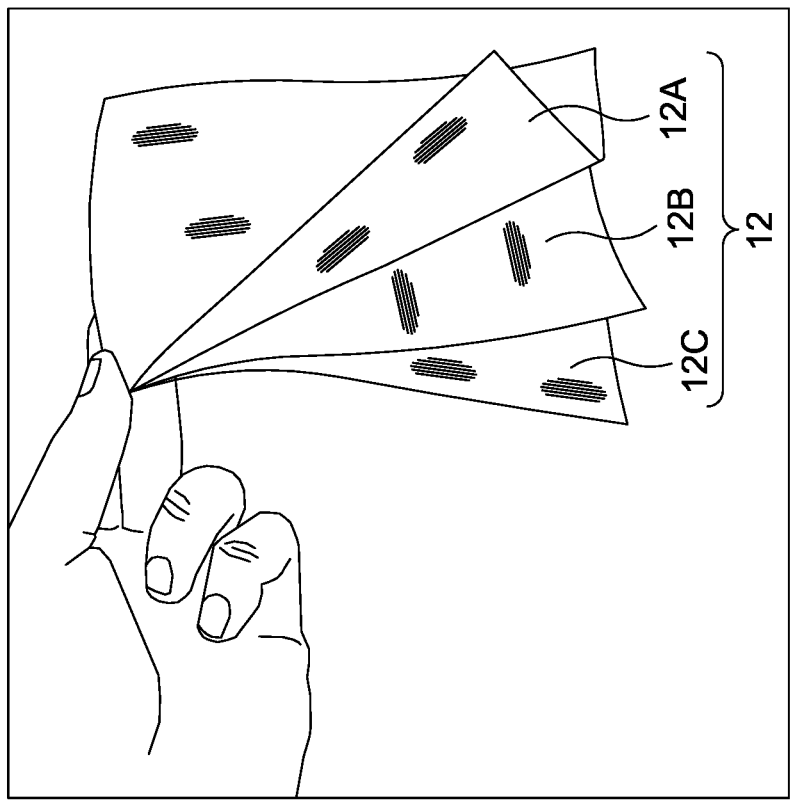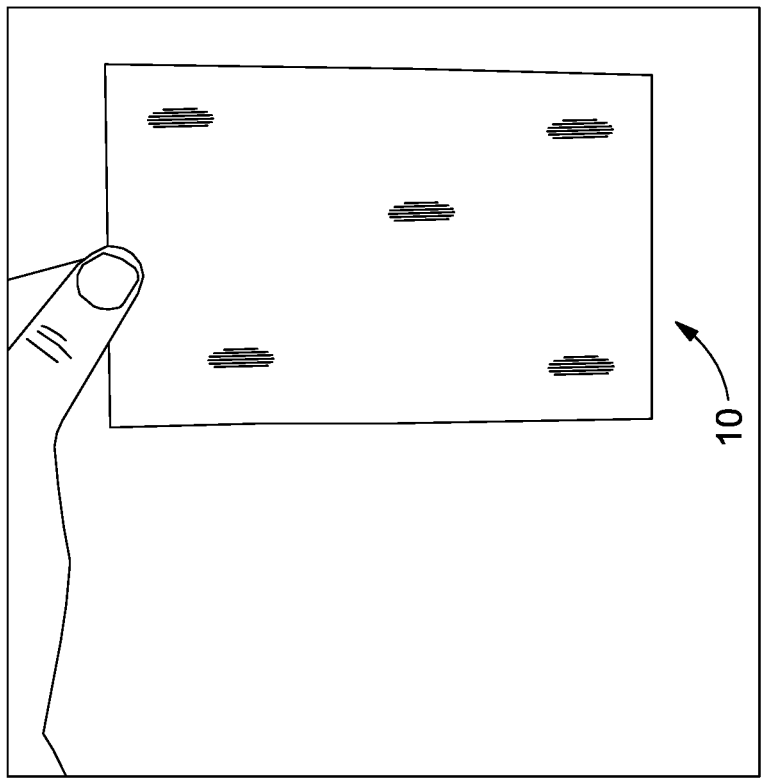
Figure 1

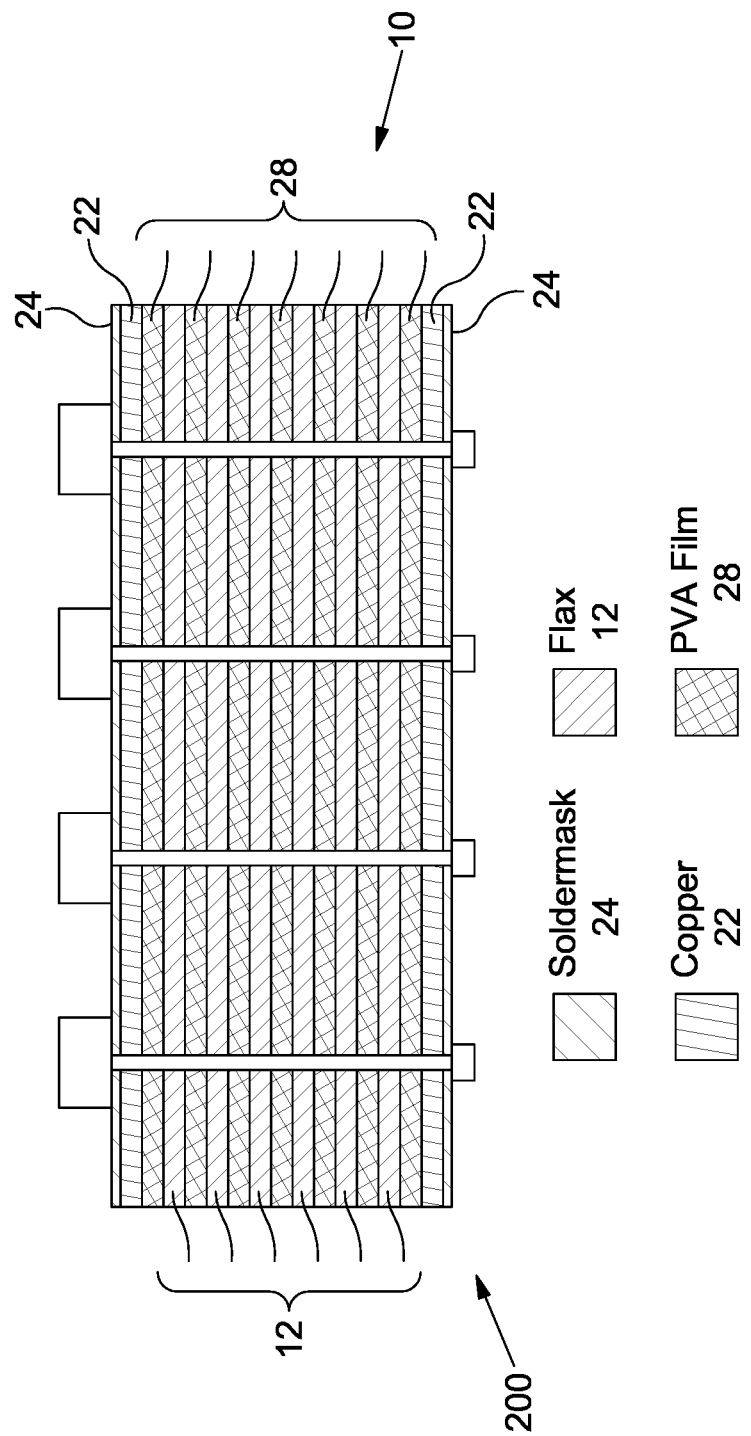

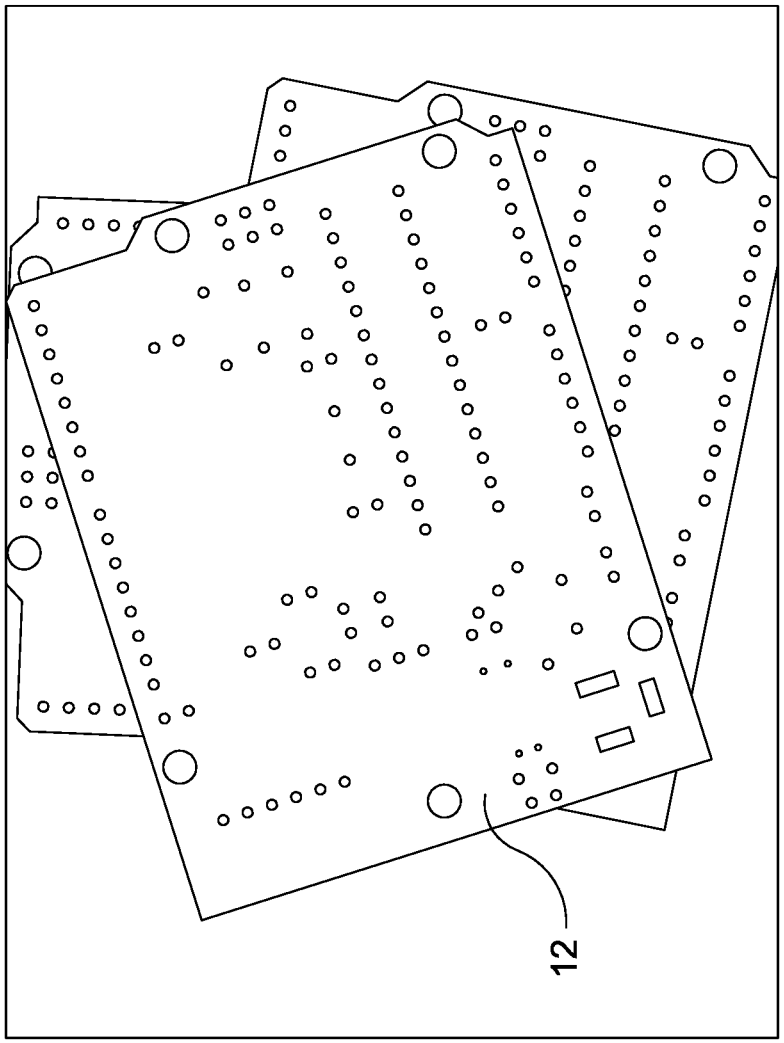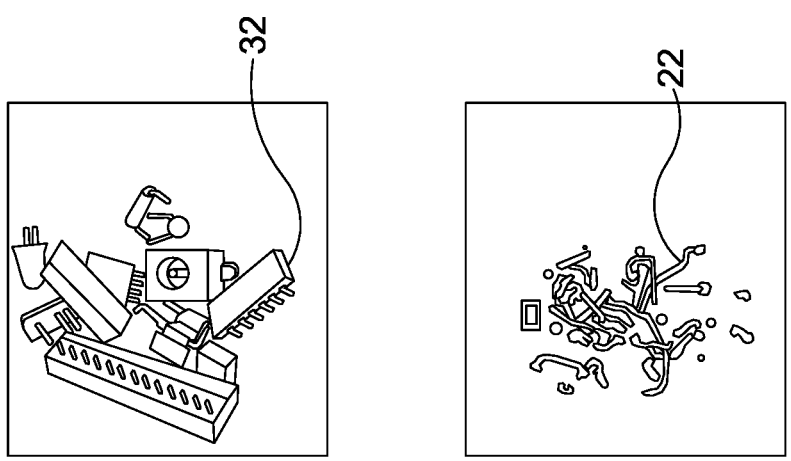
Figure 12

COMPOSITE STRUCTURE

RELATED APPLICATION

This application is a U.S. National Phase Application of International Application No. PCT/GB2018/051723, filed Jun. 20, 2018, which claims priority to GB 1709925.0, filed Jun. 21, 2017, the disclosures of which are incorporated herein by reference.

TECHNICAL FIELD

This invention relates to a composite structure and a method of making it. The invention further relates to use of the composite structure as a substrate for a printed circuit board (PCB).

BACKGROUND TO THE INVENTION

The ever-increasing influence of the 'Internet of Things' is dramatically changing the way that we interact with our products as well as how they interact with one another. Precious metals are becoming increasingly more valuable due to their demand in the electronics industry. This is caused by the current lack of disassembly considerations implemented at the point of manufacture.

41.8 million Metric tonnes of e-waste were generated globally in 2014. This is predicted to rise to 50 million metric tonnes by 2018. At this point in time, only 15.5% of our e-waste is being handled correctly via national programs and schemes [United Nations University, 2015].

Taking printed circuit boards, for example, these typically comprise one-use epoxies and toxic fibreglass. Electronics products are often short-lived. However, fibreglass is a hazardous substance that can only be shredded down and incinerated or transported to landfill when the PCB is no longer needed. There is very little that can be recycled, and the electronics components are permanently soldered in place and are difficult and time-consuming to extract. There is therefore a lot of wastage.

Aspects and embodiments of the present invention have been devised with the foregoing in mind.

SUMMARY OF THE INVENTION

According to a first aspect of the invention there is provided a composite structure comprising one or more layers of structural material, e.g. a plurality of structural layers. The composite structure may comprise one or more layers of adhesive material binding the one or more structural layers together. The one or more layers of structural material may be coated with a bonding agent. The one or more layers of adhesive material may be at least partially soluble or separable in water.

According to a second aspect of the present invention there is provided a method of making a composite structure, the method comprising providing one or more layers of structural material. The method may further comprise impregnating and/or coating the one or more layers of structural material with a bonding agent. The method may further comprise providing one or more layers of adhesive material between the one or more structural layers to bind the one or more structural layers together. The one or more layers of adhesive material may be at least partially soluble in water.

Due to the solubility in water of the adhesive layer and the bonding agent, the structural layers may be easily separated in an environmentally friendly way using water without the need for chemicals/toxic materials.

With reference to either the first or second aspect, the principal components of the composite structure are all biodegradable and/or non-toxic. The structure is therefore very environmentally friendly. It is a further advantage that the formed structure is rigid and stable, but can be disassembled when subjected to (e.g. immersed in) water.

With reference to either the first or second aspect, in an embodiment, the one or more structural layers are fibrous. The one or more structural layers may be or may comprise unidirectional fibres. The unidirectional fibres of alternate structural layers may be oriented orthogonally with respect to each other.

Alternating the direction of the layers—cross-lamination—advantageously provides the resulting composite material stack with compressive and tensile strength in both directions. In an alternative embodiment, the layers are not unidirectional and the orientation of consecutive layers is not important. This advantageously enables a wider variety of materials to be utilised e.g. for applications where structural rigidity is less important. Chopped fibres may be used as a more cost efficient alternative, whereby they are also impregnated with a water soluble bonding agent. Although the composite would no longer be a laminate, this method could also comprise a sandwich composite filling i.e. with cross-laminated unidirectional fibres as the outer layers and chopped fibres in the middle.

In an embodiment, the one or more structural layers are or comprise a natural or organic material. The natural material may be flax or jute. It is advantageous to use flax since it is a natural/organic resource. It is widely available, replenishable and sustainable. It is also environmentally friendly and easily disposed of via composting or the like. However, any natural/organic material capable of being spun into long fibres may also be used. Any other biodegradable/biological fibres may be used, including cotton, hemp or bagasse. Biodegradable polymeric fibres such as polylactic acid (PLA) may also be used. Fibres with a high length to width ratio can afford more mechanical strength to the composite material.

In an embodiment, the bonding agent is a water-soluble binder or coating. The bonding agent may be a water-soluble synthetic binder.

The bonding agent may be a polyvinyl alcohol-water solution or resin. Advantageously, the polyvinyl alcohol-water solution bonds the adhesive layers together, thus bonding the structural layers together. This adds rigidity to the composite structure. The grade of polyvinyl alcohol used may be chosen to control/vary the humidity resistance of the substrate. Grades of polyvinyl alcohol with degrees of hydrolysis between 80-90% are preferable, to avoid reaction with humid environments and in ambient temperatures. This can advantageously help ensure the composite structure is stable when not subjected to water and/or relatively high humidity. The polyvinyl alcohol may comprise a plasticizer. It may be a partially saponified polyvinyl alcohol. Instead of polyvinyl alcohol, the binder may be an acrylic binder, a polyester binder, a polyetherurethane binder or a hot-melt adhesive.

In an embodiment, the one or more layers of adhesive material are or comprise a water-soluble film. The water-soluble film may be or comprise a starch-glycerine composition. The film may be an oxidised starch-glycerine film. It may contain a plasticizer in glycerine. Other water soluble binders of film-forming polyol compositions may also be used, such as polyvinyl acetate (PVA), polyvinyl alcohol, acrylic, polyester, or polyetherurethane.

With reference to the second aspect, in an embodiment, the method may comprise taking a plurality of sheets of structural material of a size (width×height) that is slightly larger than that needed for the final composite structure. Coating the layers may comprise saturating and/or adding a plurality of coats of resin to each layer. The coated layers may be dried/cured. The method may further comprise pressing e.g. heat pressing a layer of adhesive material to one or more of the structural layers to bind the one or more structural layers together. It's convenient to wrap an elongate film of adhesive around a structural layer and adhere it to each side of the layer, but separate films could be used for each side, or just one side of the layer may be coated in with adhesive. The layers may be stacked and the adhesive caused to adhere adjacent layers together e.g. by heat pressing. The resultant stack of layers may be dried or cured and optionally cut to size.

Further protection against moisture may also be provided by coating the cut composite with a non-conductive, flame retardant and waterproof resin such as epoxy. Waterproofing may also be achieved by the treatment of the cut composite using hydrophobic nano coating technologies.

The method may comprise using a pre-prepared polyvinyl alcohol-water solution, or may comprise preparing a polyvinyl alcohol-water solution by combining polyvinyl alcohol and water. The polyvinyl alcohol-water solution can be prepared by adding polyvinyl alcohol to (cold) water, heating and stirring the mixture. Warm water may be added. The mixture may be cooled; more cold water may be added. The mixture can be left to cool until the desired viscosity is reached.

Supplementary additives afforded with biocidal properties such as methylisothiazolinone (MIT) or butyl benzo isothiazole (BBIT) may be added during the resin manufacture process. These will prevent the growth of bacteria on the polyvinyl alcohol solution as well as any saturated biological fibre layer that has not yet been dried.

In accordance with a third aspect of the present invention, there is provided a substrate for an electronics circuit assembly, the substrate comprising or consisting of the composite material of the first aspect or one or more embodiments thereof.

In accordance with a fourth aspect of the present invention there is provided a method of forming an electronics circuit assembly. The method may comprise providing a sheet of conductive/metallic film e.g. copper. The method may further comprise using a photo resist to print a circuit pattern on the conductive/metallic film optionally or preferably using acid etching. The method may further comprise applying the circuit pattern to the substrate of the third aspect or one or more embodiments thereof. A layer of soldermask may also be applied.

The method may comprise an additive process of material such as graphene or conductive inks to create circuitry, whereby the circuits are mounted directly on to the substrate without the need for removal of excess material surrounding the circuitry.

Apertures may be provided in the formed substrate, in which one or more electronics components may be mounted. The apertures may extend partially or entirely through the substrate. I.e. advantageously, the invention provided for both through-hole and surface mounted components, which may be attached using traditional solder. This enables aspects and embodiments of the invention to be used in both single- and double-sided boards, with both through-hole and surface mounted components, and using conventional soldering techniques. Using copper for the conductive traces e.g. over alternatives such as conductive ink, advantageously enables an electronics assembly so constructed to operate with minimal internal resistance.

Since the substrate will react to water, the copper traces can be etched separately from the substrate. Acid etching advantageously enables electronic circuitry to be printed with high precision.

In accordance with a fifth aspect of the present invention there is provided a method of removing electronics components from an electronics circuit assembly comprising a substrate according to the third aspect. The method may comprise placing the electronics circuit assembly into a bath of water. The method may further comprise separating the structural layers of the substrate. The layers can be separated by hand or mechanically through immersion and agitation— the structure becomes pliable releasing the components and traces and anything else mounted on the substrate enabling them to be recovered. The process of removing a component with the intention of reuse is therefore much more efficient. If this process were to be replicated on a mechanical scale, it would also mean that the material loss involved in shredding standard PCBs and reclaiming the raw materials would be avoided.

Advantageously, the disassembly permits components to be removed from the substrate in one piece and potentially reused. The conductive (e.g. copper) traces can also be removed and recycled. This removal process is not only beneficial ethically and environmentally, but also financially—the less labour intensive method of removal means that such a system could be implemented on a larger industrial scale. The organic/natural layers can advantageously be disposed of by composting or may be able to be reused/repurposed.

Features which are described in the context of separate aspects and embodiments of the invention may be used together and/or be interchangeable. Similarly, where features are, for brevity, described in the context of a single embodiment, these may also be provided separately or in any suitable sub-combination. Features described in connection with the device may have corresponding features definable with respect to the method(s) and vice versa and these embodiments are specifically envisaged.

BRIEF DESCRIPTION OF DRAWINGS

In order that the invention can be well understood, embodiments will now be discussed by way of example only with reference to the accompanying drawings, in which:

FIG. 1 shows a composite material that can be used as a substrate;

FIG. 7 schematically shows a PCB 200 according to an embodiment of the invention;

FIG. 12 shows sample products reclaimed.

DETAILED DESCRIPTION

Figure 2A:
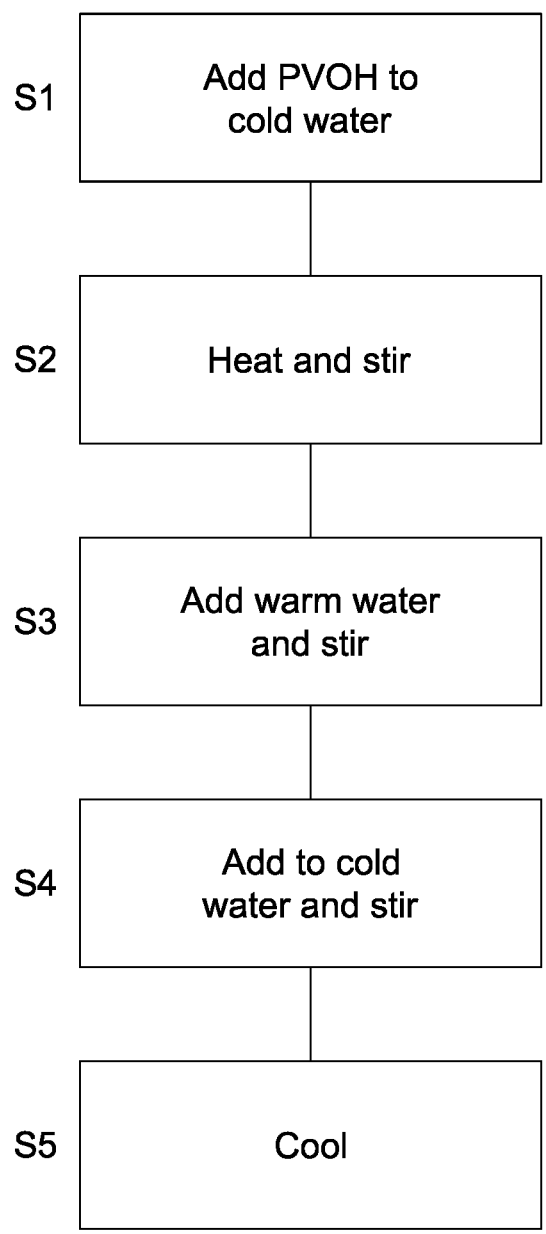
FIG. 2a shows a flowchart of a method of preparing a polyvinyl-alcohol-water solution/resin.

The invention provides a method of making a composite structure such as a board or substrate 10 that is soluble in water. The product will be commercialized under the name 'Soluboard™'. FIG. 1(a) shows a substrate 10. The substrate 10 is formed of multiple layers 12. The embodiment of FIG. 1(b) shows three layers 10a, 10b, 10c. In a preferred embodiment, the substrate 10 has nine layers 12, but any number of layers 12, e.g. between six and nine inclusively may be used as required by a particular application. Different thicknesses of PCBs may be used in different types of products. The industry standard is approximately 1.6 mm thick and it is still widely used within white goods and domestic appliances, for example. Multilayer boards are becoming thinner (approximately 0.8 mm)—these are used within mobile phones and higher end electronics.

The substrate 10 is formed of three constituents: one or more sheets 12 of natural fibres such as unidirectional flax fibres and a bonding/adhesive film 28 (see e.g. FIG. 7). The sheets 12 are coated or treated with a polyvinyl alcohol-water solution. The substrate 10 may comprise other constituents, but these are the three main constituents.

Although flax is described throughout as a suitable natural material to use, other/similar organic materials which are able to be turned into unidirectional fibre sheets could be used e.g. jute, cotton, hemp or bagasse. Biodegradable polymeric fibres such as polylactic acid (PLA) may also be used. The flax may be unidirectional, with an area weight of 110 g/m² for example, that can be increased/decreased depending on the desired properties of the composite. The fibres may be bound together with natural pectin obtained from the flax. An example of this may be the FlaxTape 110 g/m² manufactured by SAS Lineo. An alternative would be Biotex Flax Tape 150 g/m² manufactured by Composites Evolution Ltd. The fibres in this product are bound together with the biodegradable polylactic acid (PLA) biopolymer with a concentration of 5-10% and a concentration of 90-95% flax natural fibre. The grade of the polyvinyl alcohol-water solution can also be varied to control the humidity resistance of the substrate and anything formed using the substrate (e.g. an electronics assembly such as a PCB). The film 28 may be polyvinyl alcohol based and be formulated to provide alkaline resistance, such as the Hi-Selon SH-2504 film manufactured by The Nippon Synthetic Chemical Industry Co. Ltd.

The film 28 may instead be a starch-glycerine film, and may be an oxidised starch-glycerine film. It may contain a plasticizer in glycerine, such as the Hi-Selon C-100 film manufactured by The Nippon Synthetic Chemical Industry Co., Ltd. The main composition of that film is oxidized starch. The film is soluble in water.

A polyvinyl alcohol composition such as those disclosed in U.S. Pat. No. 3,413,229A may be utilized. These compositions contain a plasticizer. 'Kuraray Poval' partially saponified polyvinyl alcohol, provided by Kururay Europe GmbH, may be used. This is soluble in water and is available in granular form. It will, however, be appreciated that other polyvinyl alcohol compositions may be utilized.

Preferably, the grade of polyvinyl alcohol/polyvinyl alcohol-water solution used can withstand relatively high humidity, preferably with a degree of hydrolysis between 80-90%. The grade should preferably be one that does not dissolve in a lower temperature water i.e. will only dissolve above a particular threshold temperature.

The Kururay polyvinyl alcohol granules can be formed into a resin/solution to achieve the desired material properties, including viscosity and solution concentration. The process is discussed below. The temperature at which polyvinyl alcohol becomes soluble in the substrate 10 is defined by the grade which is used to create the resin. In an embodiment, the 'Kururay 3-85' grade is used.

Depending on the exact polyvinyl alcohol and/or the starch-glycerine film 28 used, both of which are soluble in water, different solubility attributes can be given to the resultant substrate 10. The resultant substrate 10 can dissolve in any temperature of water. However, in order to benefit from the properties of the material in the most effective manner, preferably the water has a temperature of at least approximately 90° C. Although there is no maximum temperature, subjecting electronics components to higher temperatures and especially over a prolonged period may damage the components.

The resin is manufactured combining polyvinyl alcohol granules and water through a process of heating and stirring, adding warm water and stirring, adding the mixture to cold water and stirring and then cooling.

Specifically, the resin is manufactured in a ratio of 1 part polyvinyl alcohol granules to 4 parts water as the final composition. The steps in an exemplary manufacturing process, with reference to FIG. 2a, are as follows:

1. Step S1: At a ratio of substantially 1:4, measure out polyvinyl alcohol granules into cold water (at a temperature of approximately 10° C.-20° C.), e.g. 50 g of PVA granules into 200 ml of cold water. The granules become enlarged and saturated. Ensure all granules from the sides of the vessel are removed.
2. Step S2: Stir, and then move the mixture to a heating vessel, preferably filled with hot water (minimum temperature of approximately 90° C.). Stir again (note—the granules will begin to clump together).
3. Continue stirring until the clumping begins to dissipate—for approximately 5-10 minutes. Some foaming may occur.
4. Cover the polyvinyl alcohol/water solution and leave to simmer at approximately 90-100° C. for about 5-10 minutes.
5. Step S3: Uncover the polyvinyl alcohol-water solution and add a further 50 ml of warm water (e.g. approximately 30° C.). Continue to stir until all of the granules have completely dissolved (for a further 5-10 minutes approximately). The quantity of liquid will reduce to approximately 200 ml.
6. Step S4: Move the solution to another vessel filled with cold water. Continue to stir until the solution begins to de-foam. Step S14: Cool the mixture to between about 10° C.-20° C.
7. Step S5: Transfer the cooled solution to an airtight container and leave in a cool environment for about 10-12 hours to reach the desired viscosity.

The prepared polyvinyl alcohol-water solution/resin and the aforementioned polyvinyl alcohol or starch-glycerine film are combined with layers of flax to create the substrate 10, as is described below. An example is shown in FIG. 1.

The substrate 10 is formed of multiple layers 12 of unidirectional flax fibre. Adjacent layers 12 are oriented in alternate directions with respect to one another. This cross lamination provides compressive and tensile strength in both directions. The layers 12 are bonded using a combination of the polyvinyl alcohol-water resin and the polyvinyl alcohol (or starch-glycerine) film 28 described above. In an embodiment, the substrate 10 may be formed as e.g. a 170×170 mm substrate formed of nine layers of unidirectional flax fibre, having a total thickness of 2 mm thick or e.g. a substrate formed of six layers of unidirectional flax fibre having a total thickness of 0.9 mm, or e.g. ten layers of unidirectional flax fibre, having a total thickness of 1.5 mm.

Each layer 12 of flax is impregnated with or has two layers of polyvinyl alcohol resin coated or painted on to each side, ensuring that the material is fully saturated. The layers are then allowed to dry using infra-red heating or at room temperature for approximately 12 hours. The process of drying results in the water of the resin evaporating away, leaving behind the polyvinyl alcohol-water resin saturated flax sheets. The dried flax layers 12 are then placed in between layers of the film, or into individual envelopes of the starch-glycerine film, which can either be stapled or heat sealed around the perimeter of the treated flax.

Figure 2B:
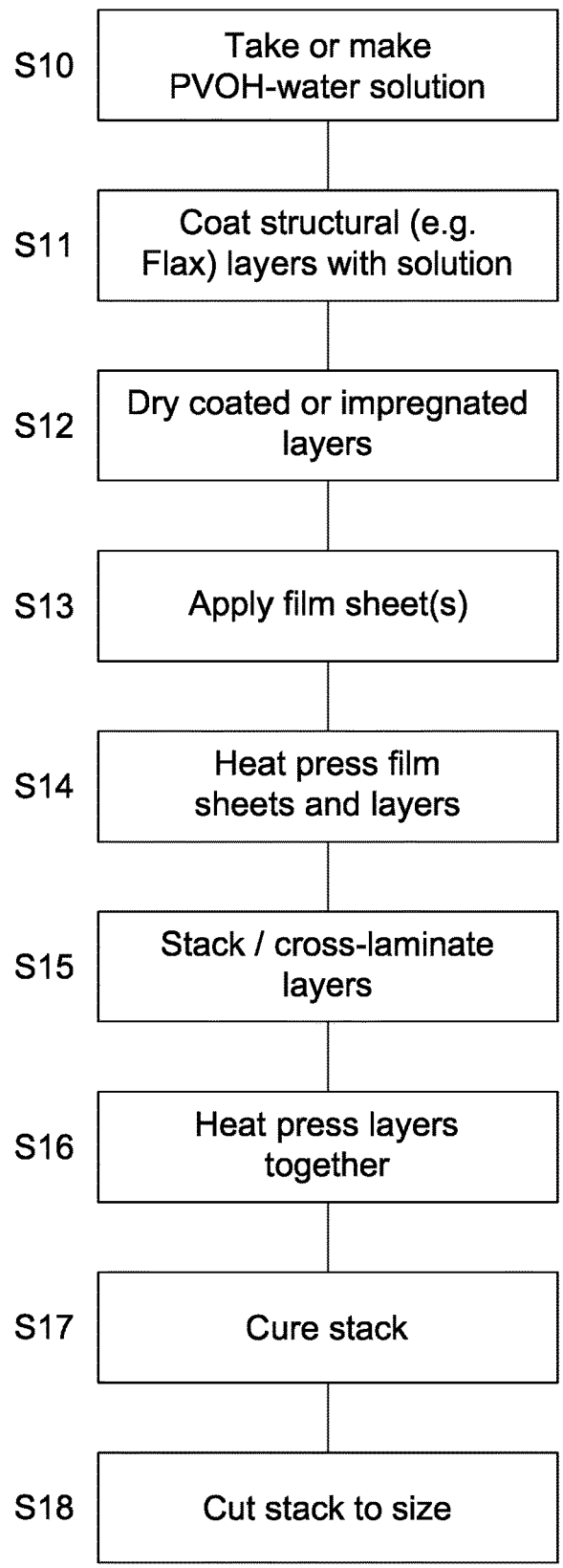
FIG. 2b shows a flowchart for forming the composite material.

These layers 12 can then be heat pressed individually or together as an alternating orthogonal lay-up to activate the adhesive properties of the polyvinyl alcohol, and allow the flax to be laminated by the polyvinyl alcohol or starch-glycerine film 28. If heat-pressed individually, the layers 12 are then cross laminated and heat pressed further until the desired thickness is reached. It is this layering which gives the substrate 10 the ability to delaminate when immersed in (hot) water. The full details of an exemplary manufacturing process are as follows (with reference to FIG. 2*b*):

1. Cut desired length of unidirectional flax from a roll e.g. cut the nine sheets. The sheets should be cut to a size, i.e. there should be a perimeter of material, that is slightly larger than that ultimately needed. For example, to make a substrate approximately 170×170 mm, the sheets (e.g. nine sheets) should be cut to approximately 180×180 mm. The cut unidirectional flax may be dried using infra-red heating to remove excess water from fibres. There should be internal moisture content of approximately 10% prior to impregnation. Steps 10, 11: Prepare the prepared polyvinyl alcohol-water resin in accordance with steps S1-S5 or take the prepared polyvinyl alcohol-water resin and apply it to the unidirectional flax layers or e.g. to one side of a/each sheet. Preferably the sheets 12 are fully covered/saturated with the resin, and so two or more coats may be applied. Flip the sheet(s) while still wet and apply two more coats of resin. Step S12: Allow to dry/cure e.g. using infra-red heating at approximately 120° C. or leave for about 12 hours at room temperature. Cut each layer of cured unidirectional flax to size.

Flax is an effective and cost efficient material to use, given its biodegradable properties. However, any natural/organic material capable of being spun into long fibres may also be used. The unidirectional flax may be a by-product from crops mainly grown for their seeds. Using unidirectional flax allows for the layers to be cross-laminated and therefore give strength to the substrate in both directions. Flax is widely available, being grown in most countries in the northern hemisphere—anywhere with a moderate rainfall and cooler temperatures.

2. Step S13: Insert each sheet of dried flax in between layers of polyvinyl alcohol (or alternatively into starch-glycerine film envelopes). The edges may be heat sealed or stapled to prevent the flax from sliding out. The sandwich layers may be envelopes formed of a single sheet of film folded over a sheet of flax and then secured e.g. heat sealed or stapled along three edges. This temporarily holds the film in place for pressing as it can curl under the heat of the press, so other securing methods are also envisaged. The film seems to adhere well to itself, and so using an envelope, or sheets either side of the flax is beneficial as it helps improve the quality of the end product. However, alternatively a layer of film could be applied just on one side of the flax.

3. Step S14: Heat press the polyvinyl alcohol (or starch-glycerine) film/flax layer sandwiches separately or together. Preferably the layers are heat-pressed together as an alternating orthogonal lay-up. For example, heat press each layer for 40 seconds at 70 psi at 165° C. (approximate values). In another embodiment, heat press the sandwiched layers at a pressure of 180 bar until the core of the stack reaches approximately 190° C. The heat pressing may be done on a hydraulic or a pneumatic press or an air powered press e.g. of the type used for t-shirts/other clothing. The process is similar to that of High Pressure Laminate (HPL) if manufactured on a large scale.

4. Step S15: For the layup of the unidirectional flax and polyvinyl alcohol stack, place one sheet of polyvinyl alcohol film sandwiched flax on a surface and note the direction in which the fibres extend (i.e. horizontally or vertically). Place a second sheet of polyvinyl alcohol film sandwiched flax on top, ensuring the fibres extend orthogonally to the fibres of the first sheet (i.e. horizontally if the fibres of the first sheet extend vertically, or vertically if the fibres of the first sheet extend horizontally). Step S16: Heat press the 'cross-laminated' stack, e.g. for 60 seconds at 70 psi at 180° C. (approximate values) or at a pressure of 180 bar until the core of the stack reached approximately 190° C. Woven flax sheets could be used as an alternative to the unidirectional sheets.

5. Repeating the heat pressing process, alternately cross-laminate the flax layers e.g. vertically, horizontally, vertically, horizontally etc. Flipping the stack of layers that is formed each time they are pressed can help to achieve uniform adhesion. If heat pressing the layers individually, gradually build the stack up by alternately cross-laminating the polyvinyl alcohol film sandwiched flax layers e.g. vertically, horizontally, vertically, horizontally etc. Increasing the temperature, pressure and time they are pressed can help to achieve uniform adhesion and decrease the amount of times the heat pressing may need to be repeated.

6. Continue layering until the desired sheet thickness is reached. NB. The film on each layer can sometimes bubble as it is being brought near to its melting point on each press. However, applying continuous pressure as the flax layers are built up causes the bubbling to cease.

7. Step S17: Leave the layer stack—i.e. the substrate 10—to cure until rigid, e.g. for about 10 minutes at room temperature.

8. Step S18: Cut e.g. with a band saw/laser cut the rough edges of the material to create a substrate of the desired size e.g. approximately 170×170 mm. Due to the cross lamination of the treated flax, the combustibility of the substrate 10 is relatively low. Its high degree of heat and flame resistance means it is ideally suited to the processes of laser cutting. Since there is no, or practically no burning, laser cutting results in minimal material loss and aesthetic deterioration. By way of an example recommended settings for sheets of 2 mm thick substrate 10 when cutting on a Trotec Speedy 300 Laser Cutter are 75% power, 0.6p % speed and auto PPI/Hz.

A substrate 10 formed in this way utilising cross-lamination advantageously has compressive and tensile strength in both directions.

Aspects and embodiments of the invention provide an innovative combination of flax sheets 12, coated in a polyvinyl alcohol-water resin and layered with polyvinyl alcohol or starch-glycerine film 28. The polyvinyl alcohol-water solution acts as a bonding agent for the polyvinyl alcohol or starch-glycerine film to which the flax is bonded in the heating process. The ratio of unidirectional flax fibre to polyvinyl alcohol by weight in the finished composite should be approximately 50:50 (+/−2%). It further, advantageously, adds rigidity to the resulting substrate 10.

The use of flax fibres is advantageous, since they are a very sustainable natural resource. The polyvinyl alcohol-water resin is a water-soluble, biodegradable polymer. The polyvinyl alcohol or starch-glycerine film 28 is also biodegradable and soluble in water. When the substrate 10 is immersed in (warm) water, the polyvinyl alcohol-water resin and the flax fibres separate. This allows the flax, which is a natural material, to be composted. The polyvinyl alcohol-water resin can be disposed of using standard domestic waste water systems. It is safe for marine life to live in up to a concentration of 5%.

One use of the substrate 10 created as discussed above is as a substrate for a printed circuit board (PCB). Circuitry can be applied to the substrate to form a PCB.

A preferred method of applying circuitry to the substrate 10 utilizes acid photo etching, which is commonly used in existing PCB manufacturing facilities. However, additional technical considerations must be taken into account for using the substrate 10 according to aspects and embodiments of the invention. To make a PCB, metal traces, e.g. copper, need to be etched onto the substrate 10. However, since the substrate 10 will react to water, the copper traces can be etched separately from the substrate—unlike conventional fibreglass substrate alternatives. Application of water resistant coatings to the substrate means that the etching of the copper could occur after it has been adhered to the substrate. Acid etching advantageously enables high precision circuitry to be printed.

In an embodiment, the copper that is used is approximately 0.05 mm thick with a double-sided adhesive tape mounted on the back. This keeps the material flat and rigid. It is mounted on a sheet of approximately 2 mm acrylic or a similar material. The full details of the acid etching process are provided below:

1. Mount a sheet of copper 14 (of substantially 0.05 mm thickness) on a double sided mounted backboard 15 (e.g. substantially 2 mm acrylic). Using fine wet and dry paper, roughen the surface, run under the tap and then ensure there are no patches of water left.
2. Cut a photo resist film 16 to the size of the mounted copper, optionally or preferably with an extra 5 mm (approximately) on each edge of the perimeter. Heat the copper 14 with a heat gun/hairdryer until the whole surface is warm to the touch.
3. Remove the protective coating from one side, place on top of the warm copper 14 and, using a print roller, smooth any bubbles.
4. Remove the top protective coating of the photo resist film 16 and move on to a UV box. Place the printed negative 18 of the circuits on top of the copper 14 and switch on the UV lamp for 28 seconds. Leave the negative image to develop for 10 minutes before progressing to the next step.
5. Using a coarse brush (e.g. a toothbrush), apply a sodium carbonate mix to the copper 14 and scrub. Everything that was black on the negative should begin to lift off of the copper 14 leaving a copper trace design 20. Rinse in water and check to make sure the design is correct.
6. Place the copper in an etchant tank and leave for, say, 2-3 minutes or until all of the copper has been etched away. Rinse and ensure all excess acid has been removed. Dry e.g. with a paper towel.

Figure 3:
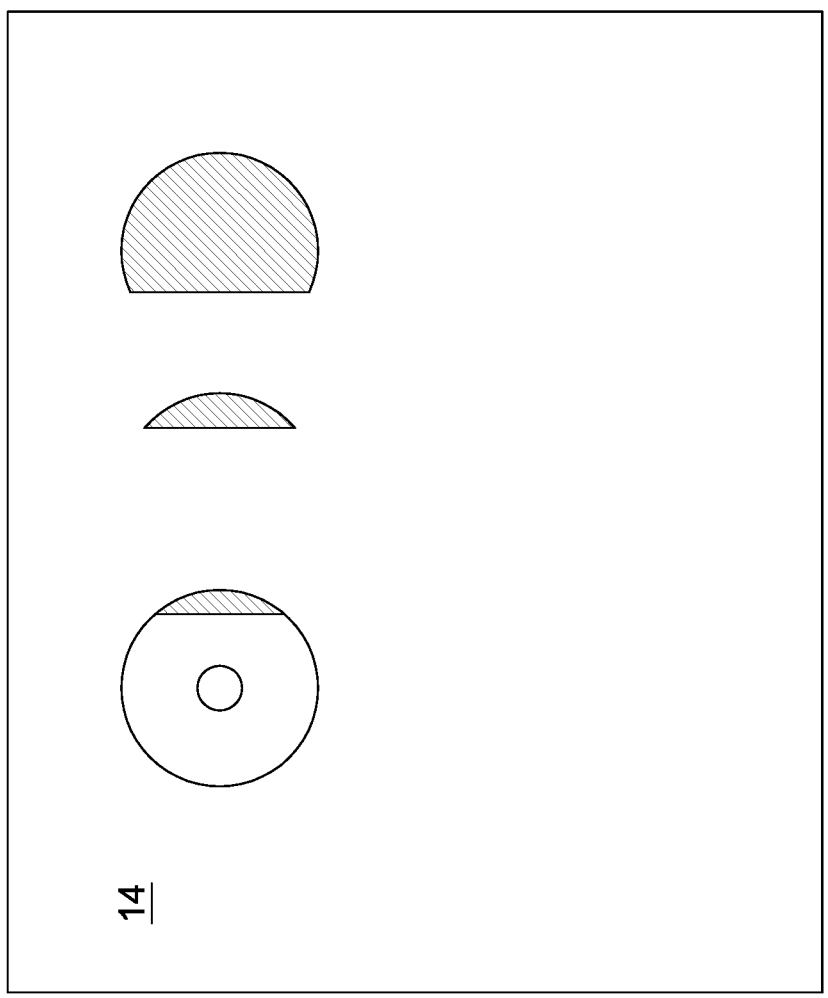
FIG. 3 illustrates etching circuitry onto a substrate.
Figure 4A:
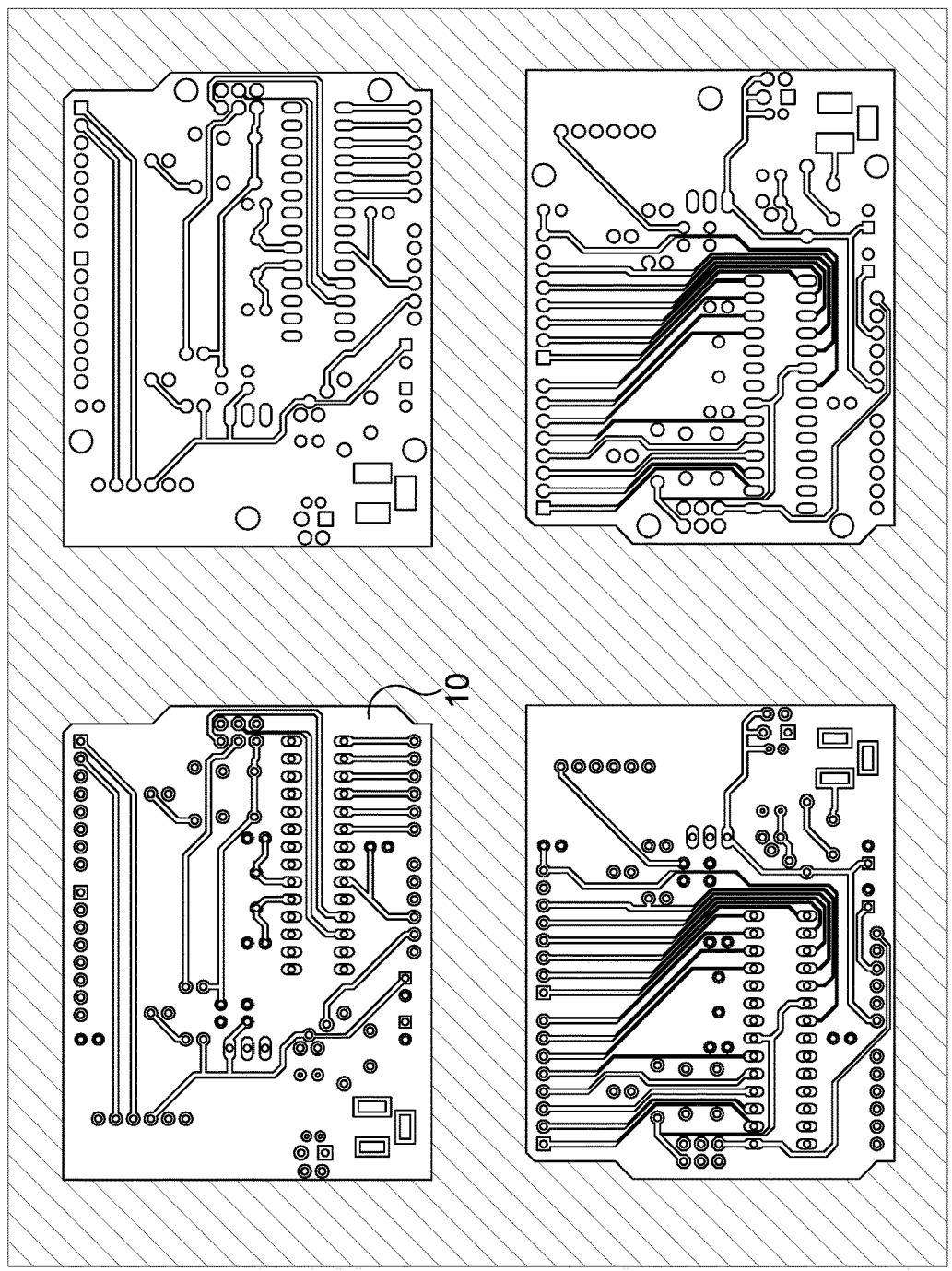
FIG. 4a shows printed trace negatives used in photo etching circuit traces for a PCB.
Figure 4B:
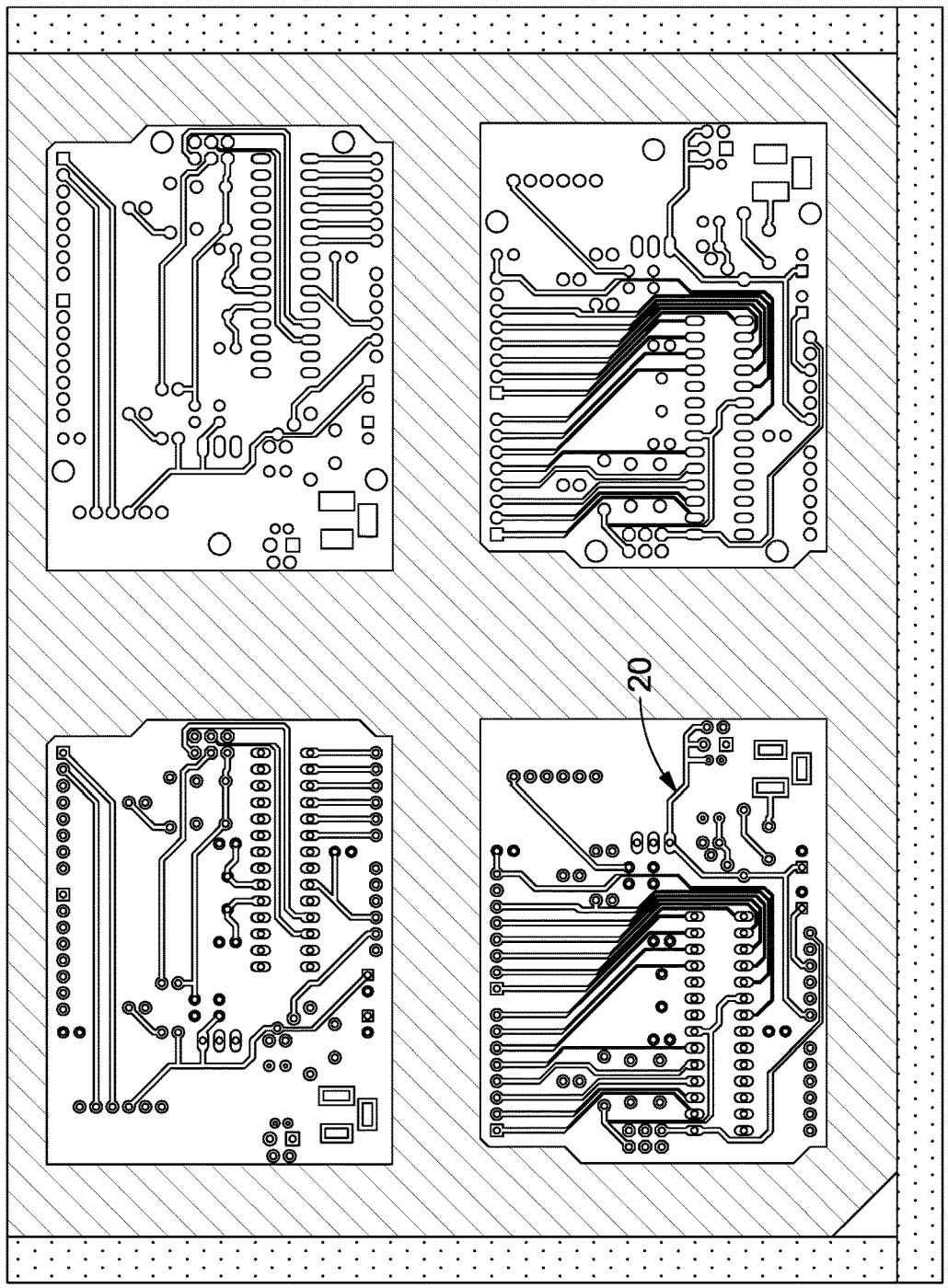
FIG. 4b illustrates an acid etching process.

FIG. 3 illustrates a test experiment with etching circuitry into the substrate with approximately 0.05 mm adhesive backed copper mounted on top. This can be achieved using fibre laser technology. FIG. 4a shows printed trace negatives used in the photo etching process of the circuit traces. FIG. 4b shows completed tests using acid etching process on approximately 0.05 mm adhesive 17 backed copper foil 14. The application of hydrophobic coatings could mean that the same steps can be repeated when the copper is mounted on the substrate. An additive process of applying conductive ink or graphene can also be used to create circuit traces.

Figure 5:
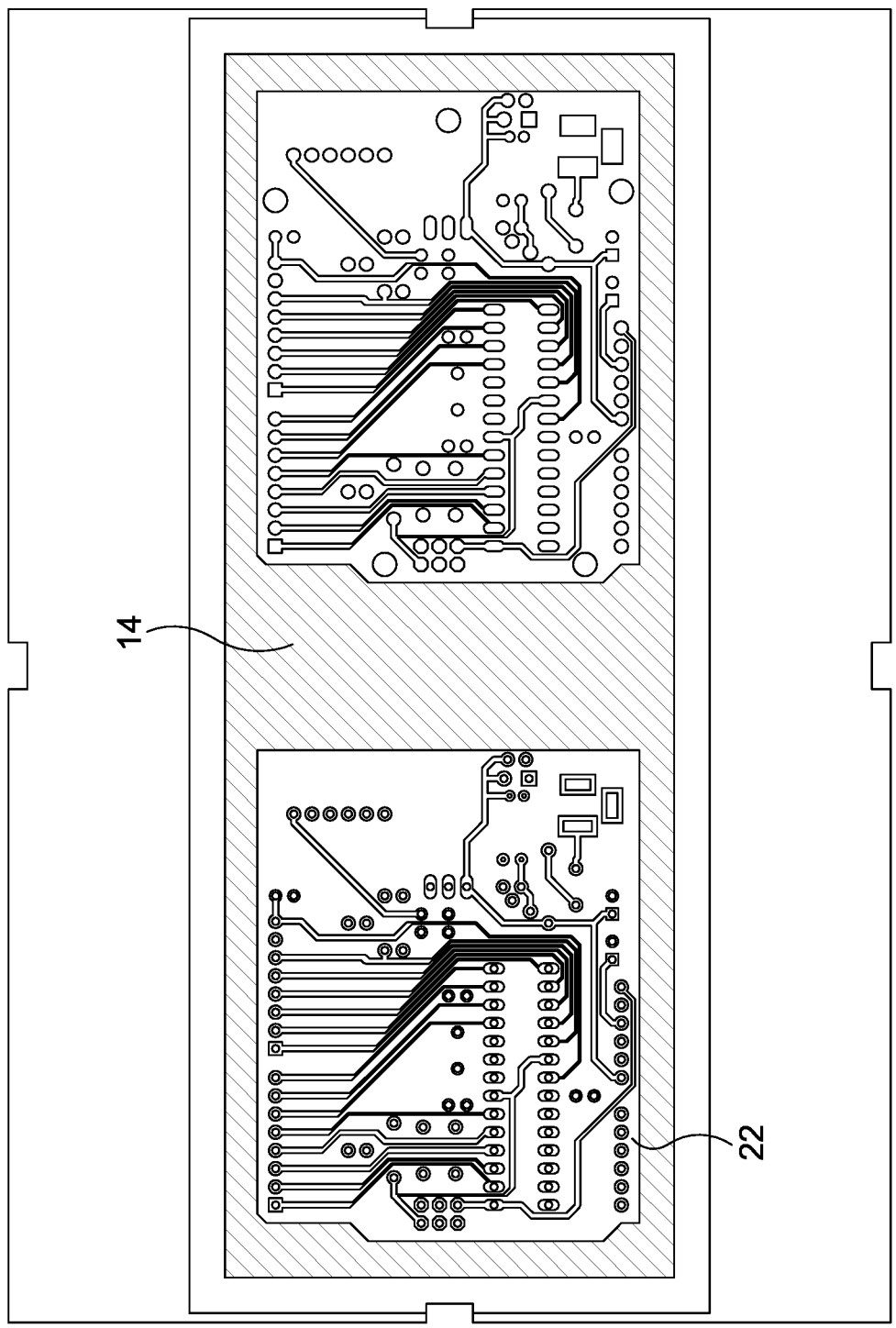
FIG. 5 shows PCB traces prior to transferal to a substrate.

7. Immerse the mounted copper board into bath of caustic soda solution. For example, a ratio of two teaspoons dissolved in 500 ml of hot water should be strong enough. Ensure that all of the photo resist film 16 has been removed. Rinse in water and dry. FIG. 5 shows the resultant copper trace 22 (on approximately 0.05 mm adhesive backed copper, intended to be transferred on to the substrate post etching).
8. Trim the copper and remove from the backboard. It is now ready to be applied to the substrate 10. This may be achieved using tacky paper which is commonly used for vinyl transfers. However, other methods are also envisaged.

The printed negative 18 is a piece of thin acetate that has the circuitry printed on to it using a conventional laser printer. It is called a negative because anything that is black will prevent the photo resist film 16 underneath it from curing when exposed to UV light. Anything that is transparent i.e. the circuitry means that the photo resist film 16 below it will cure upon UV exposure. This cured photo resist film 16 mounted on top of the adhesive backed 0.05 mm copper sheet 14 means that the copper traces below it will not etch away upon exposure to the acid bath. These combined protected areas that are left combine to make the copper trace design 20 i.e. the circuitry on a printed circuit board.

Figure 6:
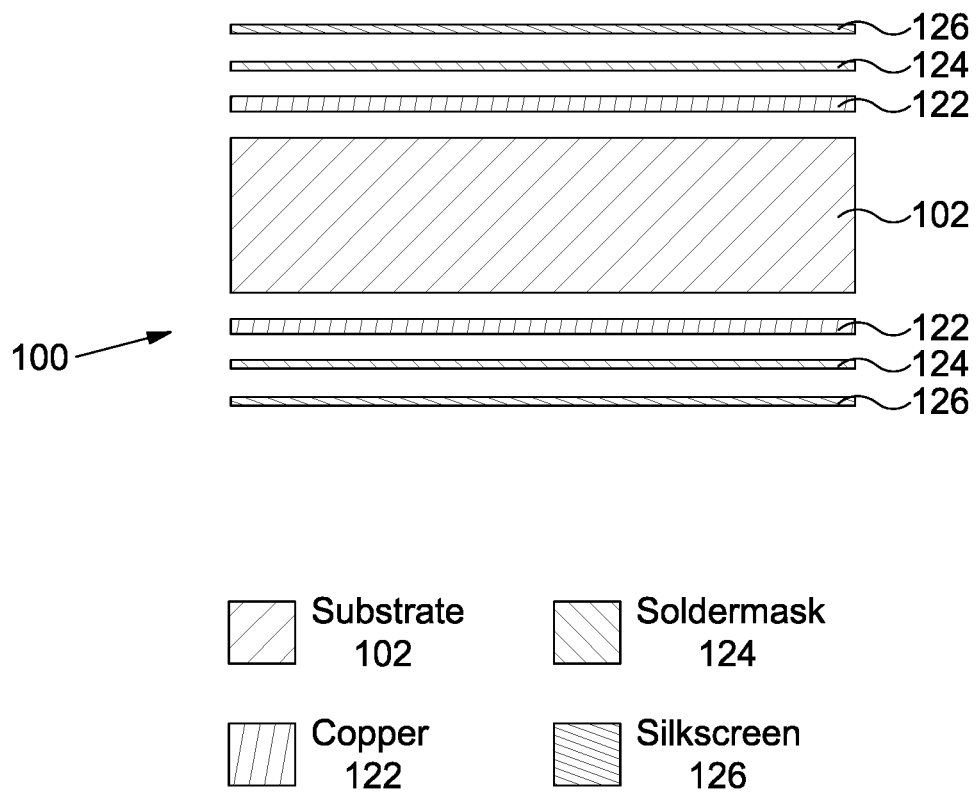
FIG. 6 schematically depicts a known PCB.

FIG. 6 schematically illustrates a conventional PCB 100. The PCB 100 has a substrate 102. Copper traces 122 are applied onto the substrate 10. Further layers of soldermask 124 and silkscreen 126 are applied on top of the copper traces 22. Conventional PCBs either have their traces etched using acid, or CNC-milled. Soldermask and silkscreen are screen-printed on and are both usually highly toxic.

FIG. 7 illustrates a PCB 200 formed using a substrate 10 formed of layers of flax 12 and polyvinyl alcohol or starch-glycerine film 28 in accordance with an embodiment of the invention. Copper traces 22 are applied to the substrate 10 as described above. A layer of soldermask 24 may also be applied. Preferably an environmentally friendly soldermask, such as a dry film soldermask (e.g. such as the dry film solder mask resist sold by Fortex), is used instead of the more toxic ones used conventionally.

Figure 8A:
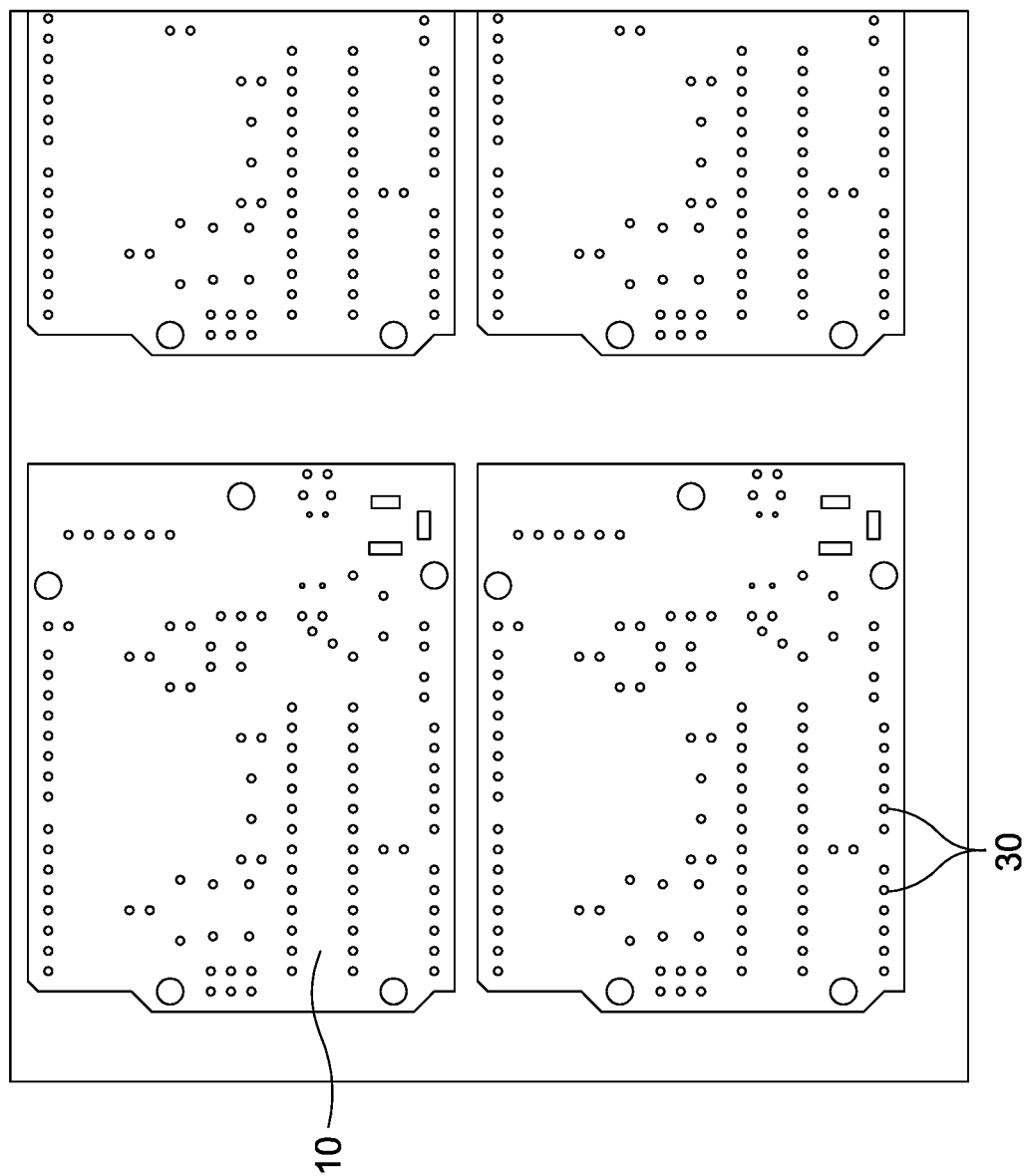
FIGS. 8(a) and (b) shows a substrate of the embodiment of FIG. 1 prepared for use in a PCB.
Figure 8B:
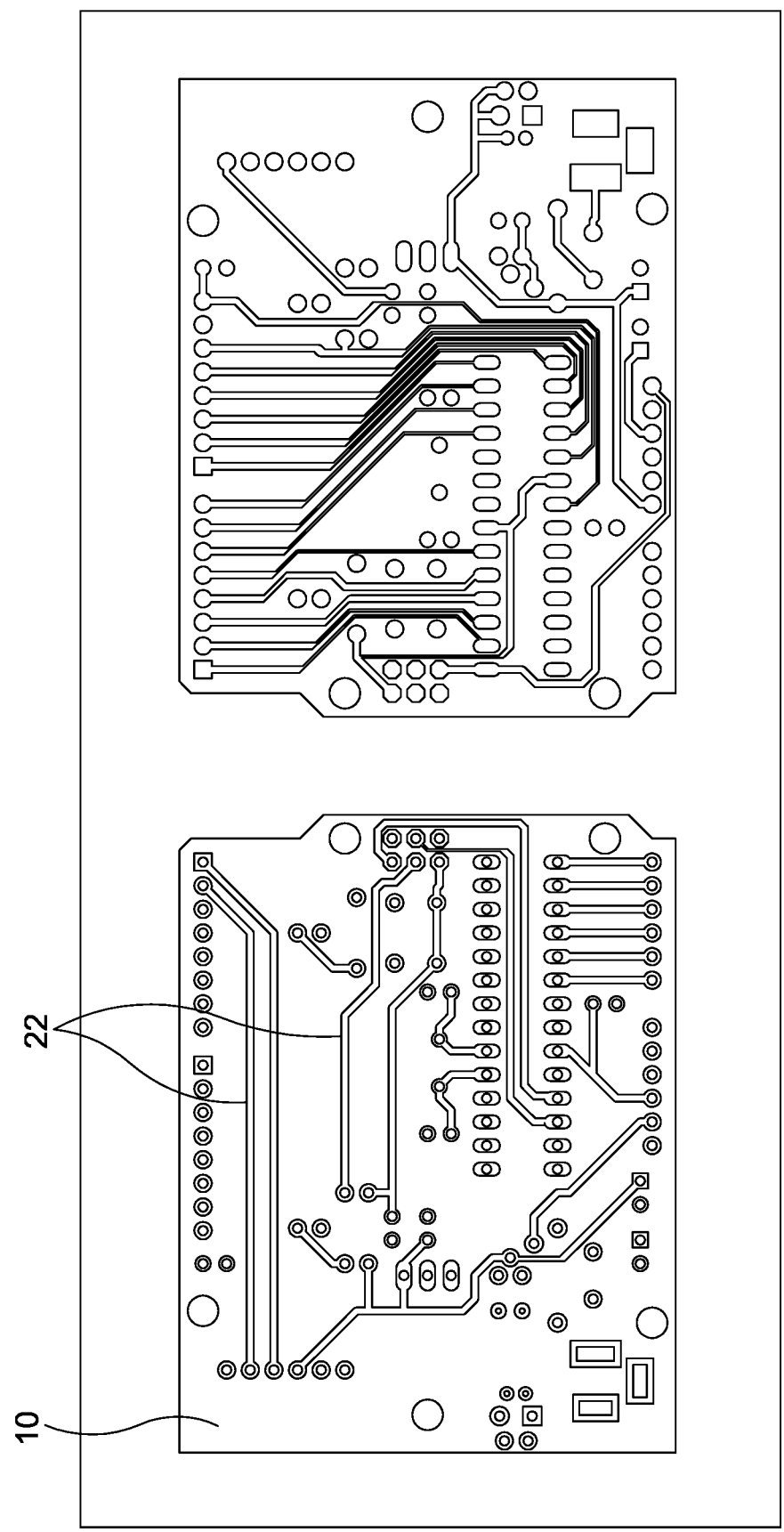

FIG. 8(a) shows a substrate 10 in which one or more holes 30 are provided in locations in which one or more electronics components 32 are to be mounted. FIG. 8(b) shows the substrate with the copper traces 22 applied.

Figure 9:
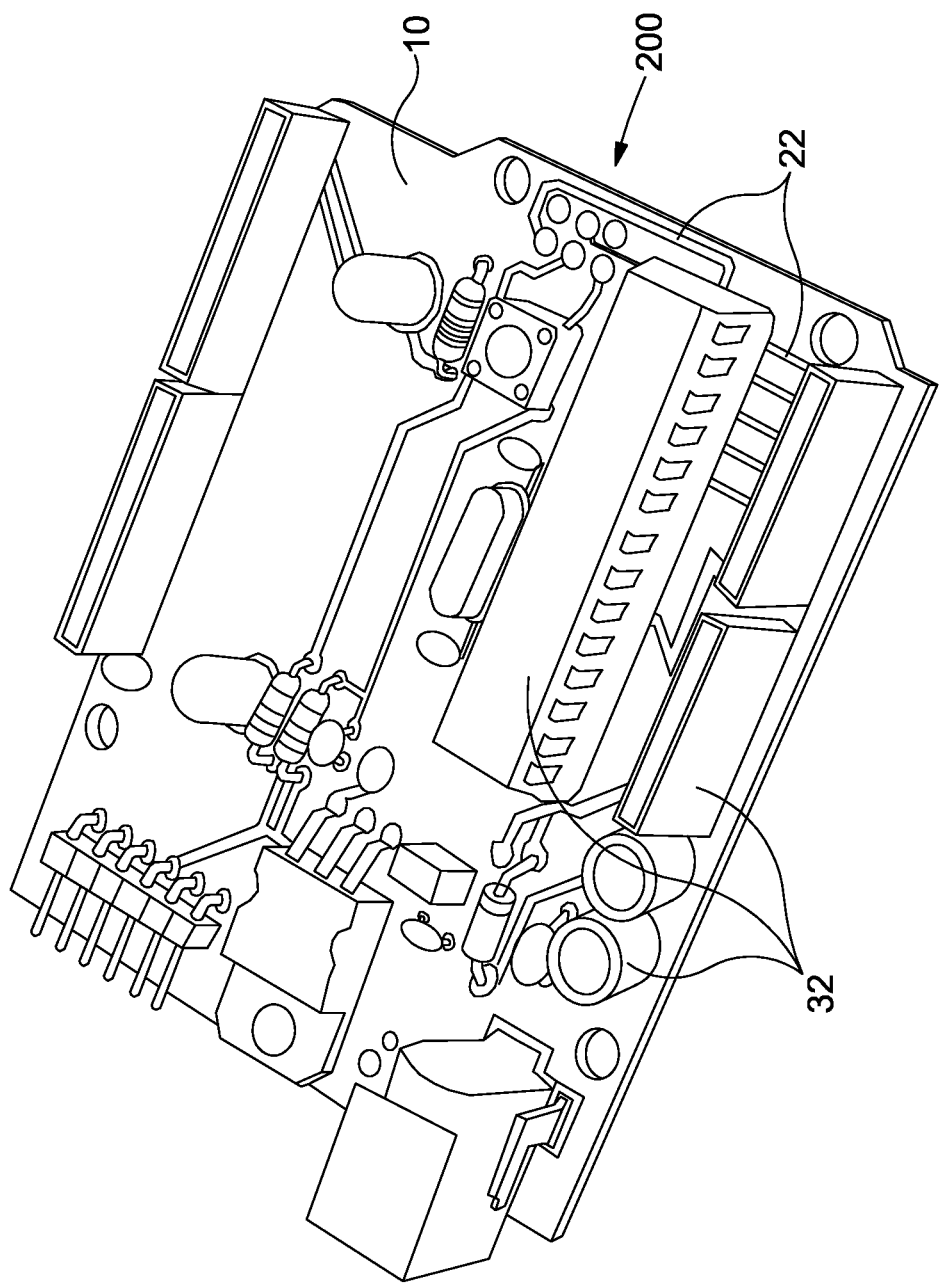
FIG. 9 shows a PCB formed using a substrate according to an embodiment of the invention.

FIG. 9 shows a PCB 200 constructed of the substrate 10 with a plurality of electronic components 30 installed thereon.

Using copper for the conductive traces 22 over alternatives such as conductive ink, enables a PCB so constructed to operate with minimal internal resistance and have both through-hole and surface mounted components attached using traditional solder. This enables aspects and embodiments of the invention to be used in both single- and double-sided boards, with both through-hole and surface mounted components, and using conventional soldering techniques. Using graphene over conductive ink would result in minimal material loss as occurs in copper etching, and can avoid the high internal resistance associated with such inks.

Figure 10:
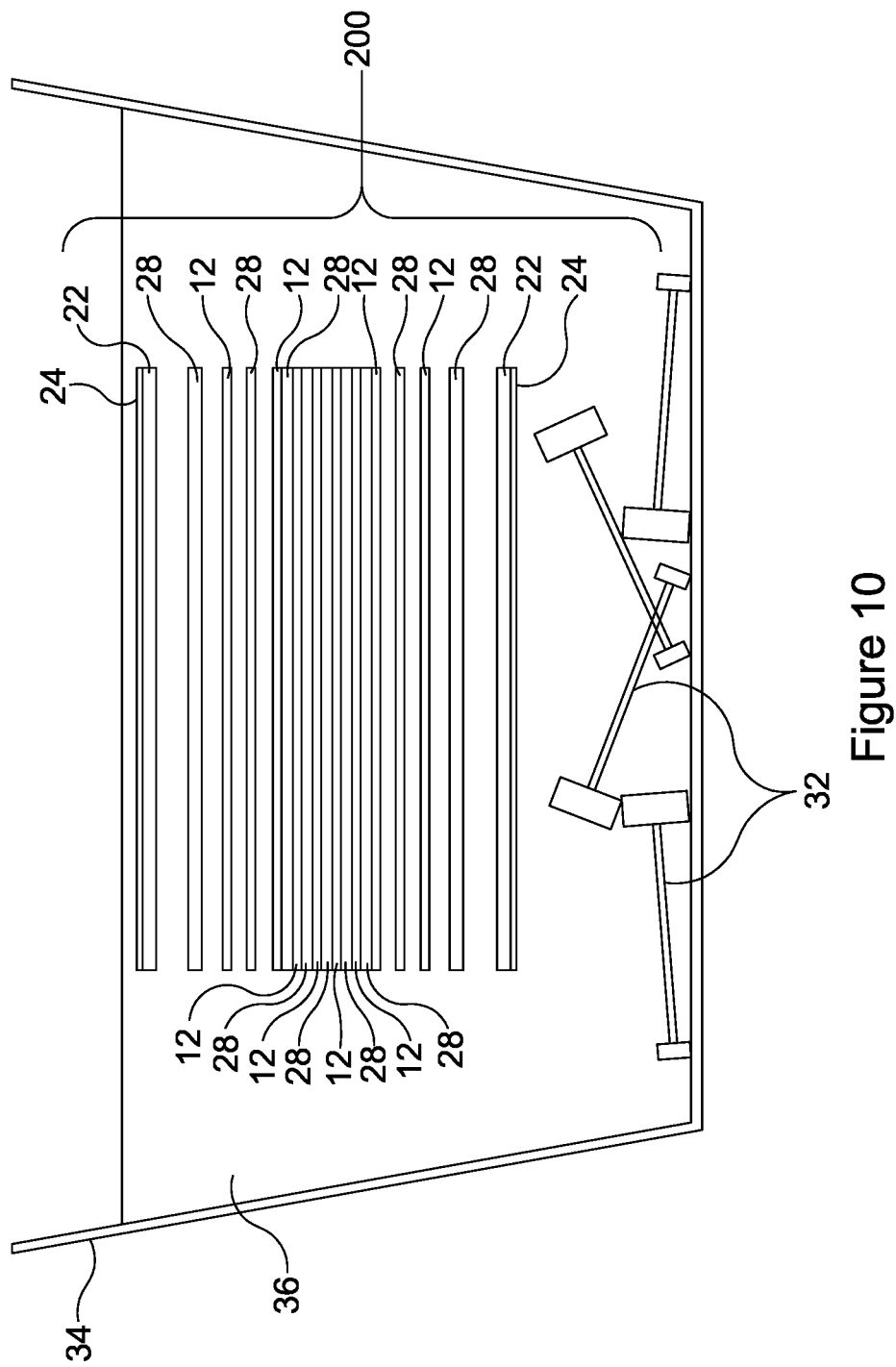
FIG. 10 depicts a delamination process of a PCB.

Any copper that has been mounted to the board can be removed and recovered together with the individual components. This results in a recovery rate of around 75-90% compared to the 15% of standard fibreglass PCBs. The recovery method is initialised by immersion of the circuit board 200 into hot water and then waiting until the substrate is pliable enough for the components to be removed by hand. This is exemplified in FIG. 10 which shows a PCB 200 placed in a vessel 34 filled with hot water 36.

Testing has suggested that in order for the most efficient process of removal of components 32 from the PCB 200 to occur, the water 36 must be kept above approximately 80° C. for approximately one hour. The substrate 10 will delaminate at lower temperatures, but at a much slower rate. The warmer the water 36, the more effective the reaction. It should be noted that longer periods of immersion at higher temperatures (90° C. or above) may result in increased chances of components 32 no longer being functional or reusable afterwards. Combining immersion with agitation would result in decreased times that a printed circuit board would have to be submerged before recycling.

It is also important to note the potential vulnerability of the substrate in high humidity environments. Tests have been carried out where the substrate 10 is locked in an airtight chamber and monitored at 99% humidity. The substrate appeared to be unaffected in the most part (other than the surface being moist to the touch). The material retains its insulation properties even at such high humidity, meaning that in the form of a PCB it would still remain functional. The only deterioration that was noted was on an exposed edge of the sample, where a droplet of condensation had come into contact and caused a slight delamination. The application of hydrophobic coatings or nano coating technologies would mean that the substrate would retain its integrity upon exposure to moisture.

Under the above preferred conditions testing has shown many components 32 so recovered to be reusable afterwards, including LEDs, resistors, capacitors, voltage regulators, switches, and fuses. Up until now, if components were to be reused they have to be de-soldered form the PCB, which is an extremely time intensive activity with often less than satisfactory results. Components are very often damaged in the process of removal. The present invention, on the other hand, provides a person with the ability to separate the layers of the PCB 200 apart using just their hands. The process of removing a component with the intention of reuse is therefore much more efficient. If this process were to be replicated on a mechanical scale, it would also mean that the material loss involved in shredding standard PCBs and reclaiming the raw materials would be avoided.

Figure 11:
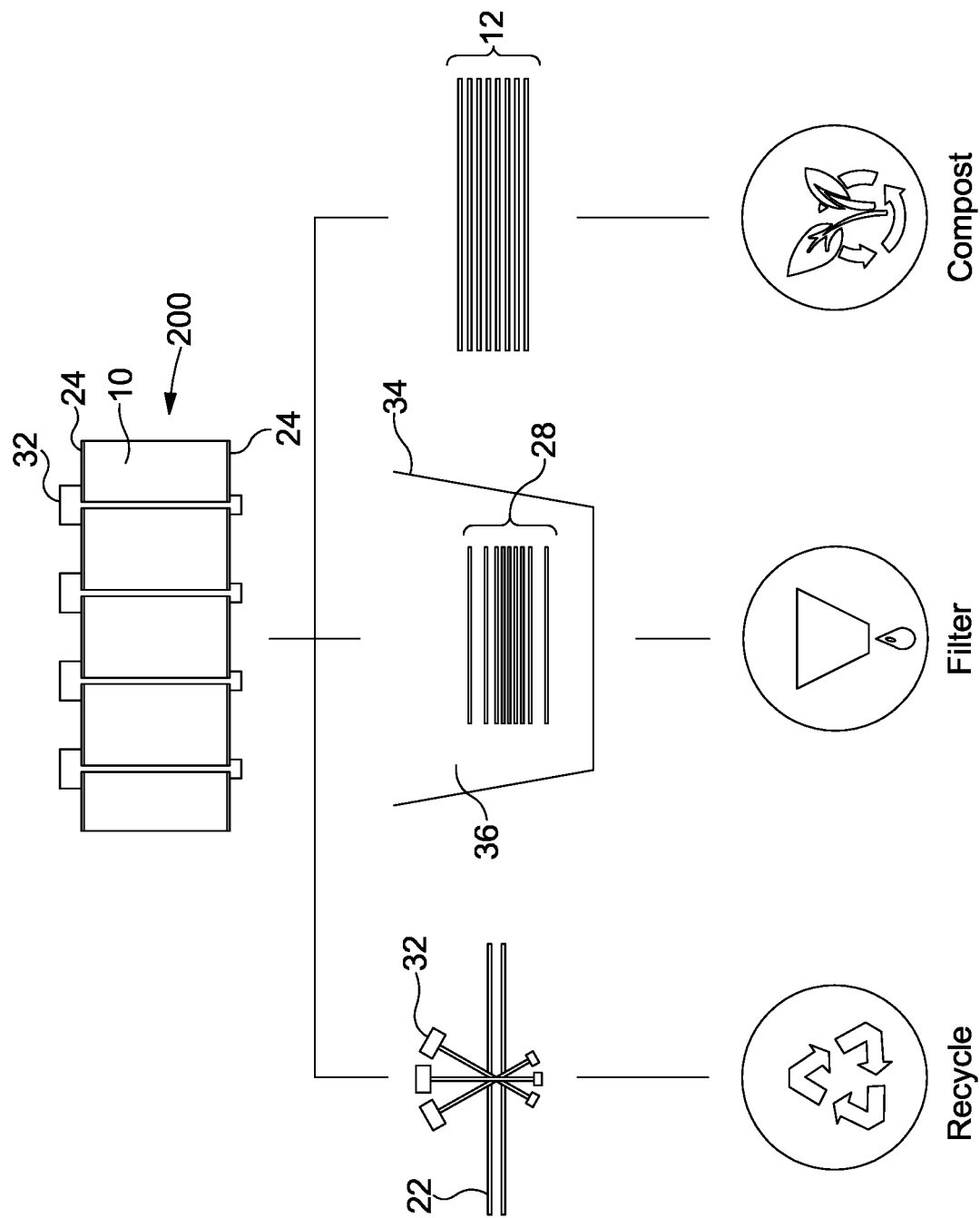
FIG. 11 illustrates reclamation of components from a PCB.

FIG. 11 summarises the delamination and reclamation processes. When a PCB 200 is placed in a bath 34 of hot water 36, the flax layers 12, the film layers 28, the circuit components 32 and the copper traces/contacts 22 can all be separated and recovered. FIG. 12 shows recovered flax sheets 12, components 32 and copper traces 22.

Advantageously, the components 32 are removed in one piece. They can then be cleaned up if they are to be reused or simply recycled. There is less need to grind the components up in order to fully benefit from their raw materials, and less chance they will simply be thrown away. This removal process is not only beneficial ethically and environmentally, but also financially—the less labour intensive method of removal means that such a system could be implemented on a larger industrial scale.

Not only can the components 32 and precious metals in the form of solder and circuitry traces 22 be reclaimed, the organic composite layers 12 can be composted or re-processed i.e. into new unidirectional fibres used to create new sheets of substrate. The film layers 28 can be disposed of via the normal domestic waste system.

As such, all three ingredients of the material are fully biodegradable and non-toxic in comparison to the toxic one-use epoxies and fibreglass used in existing substrates. The innovative substrate has mechanical properties that rival those of fibreglass. It is possible that the delaminated board could be reused/repurposed.

The properties of the by-product that the dissolving process leaves behind in the form of the water must also be considered. Chemical testing and comparisons between standard domestic tap water and the by-product have been made. Data has been collected relating to 13 major factors contributing to the toxicity of water, ranging from pH values to chlorine content. The compilation of this data suggests that there is very little change from pre-dissolving to post-dissolving. Although the total alkalinity and pH value of the water decreased, the acidity of the solution left behind is still well within the parameters that are deemed safe for disposal in domestic water systems.

Advantageously, all three (principal) components of the substrate 10 are completely biodegradable. Once the components and circuitry have been removed, the substrate will eventually transition back to organic matter. (However, with the polyvinyl alcohol or starch-glycerine film applied, initial tests suggest the flax is less exposed to the air meaning it should hold its properties for a substantial amount of time. Once disassembled, the layers of the substrate are less protected and can transition more quickly back to organic matter.) By contrast, the industry standard material, fibreglass, a hazardous substance that can only be incinerated or transported to landfill post material reclamation.

Due to the fact that all three (principal) components in the substrate 10 are biodegradable, it can be manufactured into semi-permanent circuit boards that sits somewhere between an existing prototyping board and the standard fibreglass PCBs in use in the majority of electronics. This is useful given the ever-shortening lives of electronic products.

In a further embodiment of the invention, individuals can re-use them in a new PCB, or use them as a trading commodity within a digital reward scheme. A digital platform may be provided where a user may purchase quantities of the composite material and sell back components not needed for reuse, obtain information on how to create their own microcontroller etc.

Aspects and embodiments of the invention advantageously also have uses beyond PCBs. The manufacturing process of the substrate 10 could be relatively easily adapted for the moulding industry. Adapting a heated press to work using a moulded blank as a base would allow the substrate to cure in any number of shapes. Due to the increasing number of products having some sort of electronic aspect to them, the desire may soon arise for more unorthodox board shapes to be integrated at the point of design. The impact resistance of the material 10 could mean it may have potential within the protective clothing (wearable technology) market.

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination.

For the sake of completeness it is also stated that the term "comprising" does not exclude other elements or steps, the term "a" or "an" does not exclude a plurality, and any reference signs in the claims shall not be construed as limiting the scope of the claims.

The invention claimed is:

1. An electronics circuit assembly substrate, comprising one or more layers of structural material, and one or more layers of adhesive material binding the one or more structural layers together, wherein:
the one or more layers of adhesive material are at least partially soluble such that the structural layers are separable in water, the one or more layers of adhesive material comprising one of a starch-glycerine composition and a polyol composition; and
the one or more layers of structural material comprise a biodegradable material.

2. The electronics circuit assembly substrate of claim 1, wherein the one or more structural layers are fibrous.

3. The electronics circuit assembly substrate of claim 2, wherein the one or more structural layers are or comprise unidirectional fibres.

4. The electronics circuit assembly substrate of claim 3, wherein the unidirectional fibres of alternate structural layers are oriented orthogonally with respect to each other.

5. The electronics circuit assembly substrate of claim 1, wherein the one or more structural layers are or comprise a natural material and, optionally preferably, the natural material is flax, jute, cotton, hemp or bagasse.

6. The electronics circuit assembly substrate of claim 1, wherein the one or more layers of structural material are coated with a bonding agent.

7. A method of removing electronics components from an electronics circuit assembly comprising the electronics circuit assembly substrate according to claim 1, the method comprising:
placing the electronics circuit assembly into a bath of water; and
separating the structural layers of the electronics circuit assembly substrate.

8. The electronics circuit assembly substrate of claim 6, wherein the bonding agent is a water-soluble coating and, optionally or preferably, the bonding agent is a polyvinyl-alcohol-water solution or resin, pectin or polylactic acid.

9. The electronics circuit assembly substrate of claim 1, wherein the one or more layers of adhesive material are or comprise a water-soluble film.

10. The electronics circuit assembly substrate of claim 1, wherein the polyol composition is one of a polyvinyl alcohol composition, a polyvinyl acetate composition, an acrylic composition, a polyester composition and a polyetherurethane composition.

11. The electronics circuit assembly substrate of claim 1, wherein the electronics circuit assembly substrate comprises a non-conductive, flame retardant and waterproof coating, and optionally wherein the coating comprises epoxy resin.

12. The electronics circuit assembly substrate of claim 1, wherein the electronics circuit assembly substrate is rigid and flat.

* * * * *